United States Patent [19]

Moscovitch

[11] Patent Number: 4,827,132
[45] Date of Patent: May 2, 1989

[54] TLD APPARATUS AND METHOD

[75] Inventor: Marko Moscovitch, South Euclid, Ohio

[73] Assignee: The Harshaw Chemical Company, Edison, N.J.

[21] Appl. No.: 924,636

[22] Filed: Oct. 30, 1986

[51] Int. Cl.$^4$ ............................................. G01T 1/115
[52] U.S. Cl. ................................. 250/337; 250/484.1
[58] Field of Search ............................ 250/484.1, 337

[56] References Cited

PUBLICATIONS

"Application of Fast Fourier Transformation in Thermoluminescence Thermogram Reconstruction", Pla and Podgorsak, Rev. Sci. Instrum. 55(3), Mar. 84, pp. 413–415.

Sidran, Luminescence Dosimetry With Time Lapse Indication, 2nd International Conf. on Dosimetry 1968, pp. 883–893.

Nakajima et al, On Applicability of TL Fading to Estimation of Time After Irradiation, Health Physics, 1968, pp. 782 and 783.

Moscovitch et al, LiF-TLD Via Computerized Glow Curve Deconvolution Into Component Glow Peaks, Midyear Topical Meeting 1984, pp. 4.89–4.96.

M. Moscovitch, Automatic Method for Evaluating Elapsed Time Between Irradiation and Readout in LiF-TLD, Radiation Protection Dosimetry, 1986, pp. 165–169.

Harshaw Brochure, Model 2080 TL Picoprocessor, pp. 1–11.

Lucas, Glow-Curve Analysis, Applied Thermoluminescence Dosimetry, 1981, pp. 259–269.

Fureta et al, Simultaneous Determination of Dose and Elapsed Time in Accident Dosimetry Using Thermoluminscent Materials, Radiation Protection Dosimetry 1986, pp. 161–164.

Horowitz et al, Computerized Glow Curve Deconvolution Applied to High Dose ($(10^2–10^5)$ Gy) TL Dosimetry, from Heath Plysics Meeting in Chicago, 1985, pp. 1–19, w/drawings.

Bard, Nonlinear Parameter Estimation, Academic Press, 1974, pp. 94–96.

M. Moscovitch et al, "Computer Glow Curve Deconvolution Applied to Low Dose Thermoluminescent Dosimetry".

Moscovitch et al, "LiF Termolumiescence Dosimetry Via Computerized First Order Kinetics Glo Curve Analysis", Radiation Protection Dosimetry, Vol. 6, Nos. 1-4, pp. 157–159.

V. B. Zlokazov, "Method for an Automatic Peak Search in Gamm-Ray Spectra", Nuclear Instruments and Methods, 1982, pp. 509–519.

C. Pla et al, "A Computerized TLD System", Med. Phys., 1014) 1983, pp. 462–466.

Primary Examiner—Carolyn E. Fields
Assistant Examiner—John A. Miller
Attorney, Agent, or Firm—Renner, Otto, Boisselle & Sklar

[57] ABSTRACT

A novel apparatus and fully automatic, computer implemented method for making radiation dose measurements using composite glow curve data obtained with a thermoluminescent dosimetry reader wherein such composite glow curve data is composed of the superposition of plural overlapping glow peaks plus instrumental and dosimeter background. The background component of the composite glow curve is subtracted out by using an automatic peak search technique followed by individual chip background subtraction based upon the extrapolation of the background curve under the glow curve by fitting on both sides of the curve outside the region of the peaks. Following background subtraction and automatic identification of low temperature signal limits, the leading edges of higher temperature dosimetric peaks are extrapolated to lower temperatures to subtract from the glow curve a lower temperature dosimetric peak without affecting the higher temperature dosimetric peaks. Computerized deconvolution also is effected automatically by computing initial parameters directly from the glow curve shape and with reduced processing time by applying analytical differentiation to a model equation.

36 Claims, 3 Drawing Sheets

TLD APPARATUS AND METHOD

DISCLOSURE

The invention herein disclosed related generally to thermoluminescence dosimetry and, more particularly, to apparatus and methods for making radiation dose measurements using thermoluminescence dosimetry.

BACKGROUND

Thermoluminescence dosimetry (TLD) is a technique for radiation dose measurement. Thermoluminescence is an emission of light which occurs when a thermoluminescent phosphor such as lithium flouride (LiF) is heated after having been exposed to radiation such as beta, gamma, x-ray or neutron radiation. TLD has several known advantages over other dosimetry techniques such as film dosimetry.

TLD is widely used in the fields of radiation protection, chemical radiation oncology and environmental radiation monitoring. In each of these applications, typically very large numbers of dosimeters must be routinely processed. The time needed to process a batch of dosimeters is dependent on the processing system's degree of automation, speed of analysis or processing of each dosimeter, and computer capability to store information on a large number of dose measurements.

In particular, TLD systems have been developed for monitoring personnel who work in the vicinity of radiation materials, x-ray equipment, etc. In such systems, each person being monitored typically is given a badge to wear that consequently will be exposed to the same dosage of radiation as the person wearing the badge. These badges have consisted of an outer holder which houses a TLD card insert usually containing two, three or four thermoluminescent (TL) elements in crystal form.

Periodically the TLD cards are processed through a TLD card reader to obtain an exposure record for each person being monitored. In the TLD card reader, the TL elements in each card are heated and the thermoluminescence is measured as by a photomultiplier tube and associated electronic analysis circuitry to provide a read-out ot the TL integrals and/or glow curve. In automated systems, a batch of TLD cards is loaded into the card reader which then automatically process the TLD cards preferably with no or minimal human intervention. Some readers also have the capability of digitizing the glow curves and sending the data to an external device such as a digital computer for analysis and extraction from such data of meaningful radiation dose information. A TLD card reader having these and other capabilities is a Harshaw Model 8000 TLD system sold by the Harshaw/Filtrol Partnership, Cleveland, Ohio.

The glow curve is the TL signal intensity as a function of temperature or heating time. A "pure" glow curve is composed of plural overlapping peaks where each peak, in principle, corresponds to one or more TL traps. TLD readers, however, generally provide composite glow curve data composed of the "pure glow curve" plus instrumental and dosimeter background components.

The composite glow curve data heretofore has been analyzed to obtain radiation dose information. For example, LiF thermoluminescence dosimetry is usually based on measurement of the integral of overlapping peaks (4+5) or on the measurement of the height of peak 5. The lower temperature peaks 2 and 3 at about 95° C. and about 135° C., respectively, are generally considered interfering because of their relatively short half-life. Also, the background signal may vary from reading to reading further introducing time dependence in the measured signal, i.e., dependence on time lapse between irradiation and read-out. The contribution of the interfering lower temperature peaks 2 and 3 has been eliminated via a pre-irradiation 80° C., 24 hours anneal or via a 100° C., 10 minutes post-irradiation anneal. In addition, a second reading of the "empty" dosimeter has been made to obtain an estimation of insturmental and dosimeter background which is subtracted from the first reading before measurement of dosimeter absorbed dose.

For automatic TLD readers, both the low temperature anneal treatment and the second reading of the "empty" dosimeter are not practical. In these readers, peak 2 has been eliminated by holding the readout cycle at a preheat temperature for a predetermined time. The preheat temperature is selected to be sufficiently high rapidly to empty peak 2 but low enough so as not seriously to affect the intensity of peaks (3+4+5) or alternatively peaks (4+5). Other methods occasionally in use involve obtaining the dose information from the area under the glow curve between pre-selected temperature limits. This method has been referred to as the Region-Of-Interest (ROI) method as the temperature limits define the region of the glow curve to be integrated. Background subtraction for automatic TLD readers commonly is done by recalling a previously stored constant background value and applying it to the glow curve data.

Those methods that utilize background and low temperature signal subtraction generally are time consuming. The preheat process takes, for example, at least 6 seconds at 150° C. or about 25% of a typical read-out cycle of 24 seconds. Also, it is not possible to empty completely peak 2 without affecting the intensity of peaks (3+4+5) and this results in reduced precision and less sensitivity. The use of the ROI method instead of the preheat method also is problematic. Because of possible variations in thermal contact, the position of the glow curve on the temperature/time scale can change. In that case, the pre-selected region of interest will not necessarily include complete dosimetric peaks. In addition, the high temperatuare side of peak 2, which is included in the region of interest, can introduce, again, time dependence in the results. A further drawback is that subtraction of a constant background from the glow curve ignores the fact that the background signal is both chip and time dependent and this introduces additional error in the dose measurement.

A computerized analysis technique also has been developed to deconvolute the glow into its component glow peaks. This technique is based on the fitting of a theoretical curve composed of the superimposition of three overlapping peaks of first order kinetics, i.e., peaks (3+4+5), plus electronic noise. Each peak is approximated by the expression $$P_i = Im_i \exp\left[1 + \frac{\Delta T_i}{Tm_i} \frac{E_i}{kTm_i} - \exp\left(\frac{\Delta T_i}{Tm_i} \frac{E}{kTm_i}\right)\right]$$

where $T - Tm_i = \Delta T_i$, $E_i$ is the activation energy of the i'th peak, $Tm_i$ is the temperature of the glow peak maximum, $Im_i$ is the TL intensity at $Tm_i$, and K if Boltzman's constant. The composite glow curve expression is, therefore, of the form $$Y = \sum_{i=3}^{5} P_i + c + a \exp(T/b)$$

where c is a constant adjustable background, and the planchet and dosimeter infrared contribution is given by the expression "a exp (T/b)". Y is thus a non-linear function of 12 parameters which can be fitted to a large number of experimental points using a least squares method adapted to non-linear functions with simultaneous variation of all or part of the parameters to obtain the minimum chi-squared. This technique required human intervention by way of selecting initial parameters, i.e., the technique did not enable automatic analysis of unlimited number of glow curves without any human intervention because of the need to select appropriate initial parameters. That is, first estimates had to be made of the peak positions, peak widths and peak heights. Once the composite glow curve has been deconvoluted into its several components, the undesirable separated components may be discarded and only the desirable separated components utilized for measurement of dosimeter absorbed dose.

SUMMARY OF THE INVENTION

The present invention provides a novel apparatus and method for making radiation dose measurements using composite glow curve date obtained with a thermoluminescent dosimetry reader wherein such composite glow curve data is composed of the superposition of plural overlapping glow peaks plus instrumental and dosimeter background.

According to one aspect of the invention, the background component of the composite glow curve is subtracted out by using an automatic peak search technique followed by individual chip background subtraction based upon the extrapolation of the background curve under the glow curve by fitting on both sides of the curve outside the region of the peaks. Following background subtraction and automatic identification of low temperature signal limits, the leading edges of higher temperature dosimetric peaks are extrapolated to lower temperatures to subtract from the glow curve a lower temperature dosimetric peak without affecting the higher temperature dosimetric peaks. The foregoing procedure is implemented by a computer or like device and provides for fully automatic and fast subtraction of individual chip background without destroying the component part of the glow curve used for dose measurements.

According to another aspect of the invention, computerized deconvolution of a glow curve, such as a "clean" glow curve resulting from the above background and peak 2 subtraction procedure, may be effected automatically by computing initial parameters directly from the glow curve shape and with reduced processing time by applying analytical differentiation to a model equation in place of the heretofore utilized finite differences approximation technique. The method enables automatic execution by a computer without the need of human attention, is fast and is able to handle a variety of experimental conditions.

These and other objects of the invention are hereinafter fully described and particularly pointed out in the claims, the following description and the annexed drawings setting forth in detail a certain illustrative embodiment of the invention, this being indicative, however, of but one of the various ways in which the principles of the invention may be employed.

DETAILED DESCRIPTION

Figure 1:
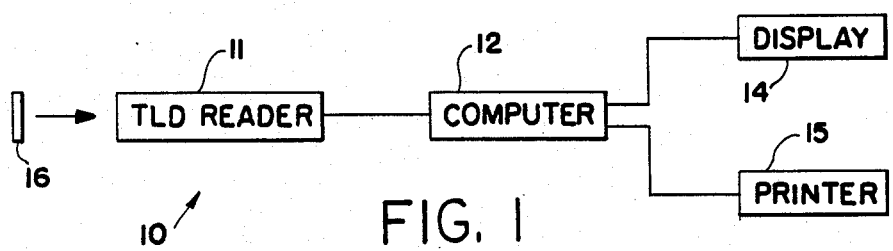
FIG. 1 is a diagrammatic illustration of radiation dose measurement apparatus according to the present invention.

Referring now in detail to the drawings and initially to FIG. 1, apparatus for making radiation dose measurements according to the invention is indicated generally at 10. The apparatus 10 includes a TLD reader 11, a computer 12 and one or more output devices including, for example, a display 14 and/or a printer 15 suitably interfaced with the computer to output dose information.

The TLD reader 11 may be of any suitable type operable to read thermoluminescence of a TL element 16 (or elements) when heated and provide glow curve data representative of the radiation dose absorbed by the TL element(s). A preferred TLD reader is one capable of automatically processing a batch of TLD cards which may contain one or more TL elements in chip form. A preferred TLD reader also is capable of digitizing the glow curve and transmitting the digitizing glow curve to another electronic device such as the computer 12 which analyzes such data to obtain meaningful radiation dose information in the manner hereinafter described. The reader may employ electrical planchet, hot gas or optical heating with a linear heating rate and, preferably, the heating rate and maximum temperature can be varied according to the characteristics of the TL material employed. TLD readers having these and other capabilities are Models 8000, 8000C and 8000N TLD readers sold by the Harshaw/Filtrol Partnership of Cleveland, Ohio.

The computer 12 may be of any suitable type operable to analyze the glow curve data acquired by the TLD reader 11 or equivalent device in accordance with the below described analysis procedure. The computer 12 preferably is a microcomputer such as a Model AT sold by International Business Machines Corporatin of Boca Raton, Fla. According to the best mode of the invention, the computer is directly interfaced with the TLD reader to receive and store the glow curve data. If the TLD reader does not have the capability of digitizing the glow curve data, a suitable analog-to-digital converter may be used as an interface between the TLD reader and computer. Analysis of glow curve data may be effected immediately upon receipt from the TLD reader although it generally may be more desirable to first store the data, such as in the data for a batch of TLD cards during a data acquisition mode, and then later batch analyze such data during a data analysis mode.

Figure 2:
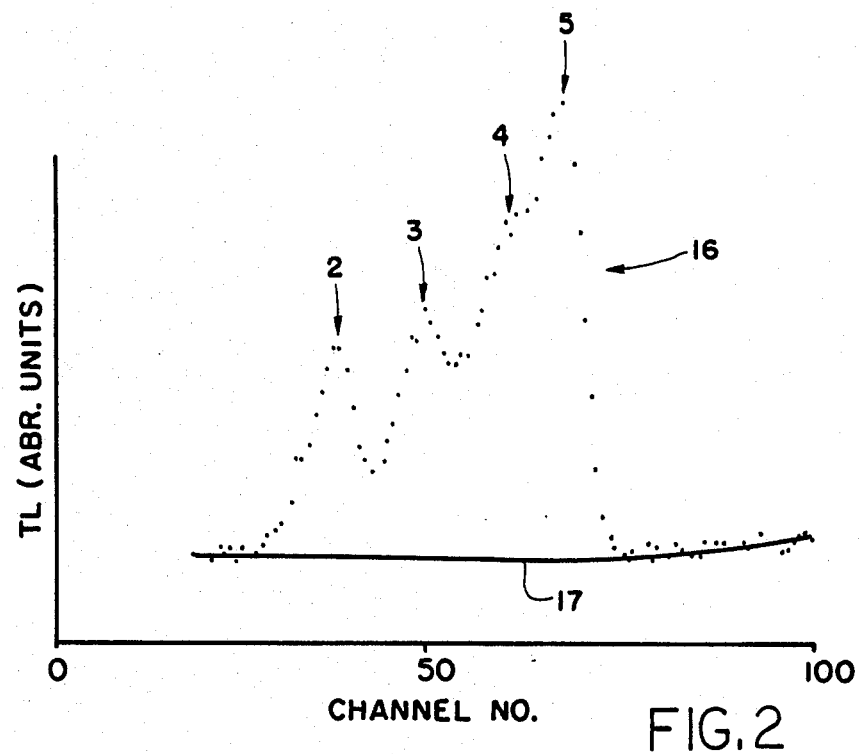
FIG. 2 is a graphical illustration of a typical digitized glow curve of lithium flouride.

In FIG. 2, a typical digitized glow curve of an irradiated TLD-100 chip (sold by the Harshaw/Filtrol Partnership) is indicated at 16. Such chip is the optimal form of LiF:Mg,Ti, which is the most widely accepted material used in thermoluminescence dosimetry. Although the following description will make reference to such typical glow curve 16, it should be understood that principles of the present invention may be used with other types of TL materials including, for example, $CaSO_4$:Dy, $Li_2B_4O_7$:Cu, $CaF_2$:Tm, $MgB_4O_7$:Dy.

As above indicated, the glow curve 16 is TL signal intensity as a function of temperature or heating time. The digitized glow curve accordingly comprises plural data points each defined by a time or temperature value and the corresponding TL signal value, the former independent variable being plotted along the x-axis graduated by channel number in FIG. 2. Using a conventional TLD reader to read a TLD chip, the digitized glow curve may comprise, for example, 200 data points.

The glow curve 16, which is typical of that acquired by conventional TLD readers, is herein referred to as a "composite" glow curve since it is composed of the "pure" glow curve plus instrumental and/or dosimeter background. The composite glow curve 16 exhibits four overlapping TL peaks over a temperature range of from about room temperature to 300° C. which are conventionally denoted peaks 2 through 5 in FIG. 2. FIG. 2 also shows by line 17 the background signal attributed to electronic noise and incandescence from the TLD reader planchet and the chip itself.

As above discussed, lithium flouride (LiF;TLD-100) thermoluminescence dosimetry is usually based on measurement of the integral of peaks (4+5) or on the measurement of the height of peak 5. The lower temperature peaks 2 and 3 at about 95° C. and about 135° C., respectively, are generally considered interfering because of their relatively short half-life on the order of hours and a few months, respectively.

Figure 3:
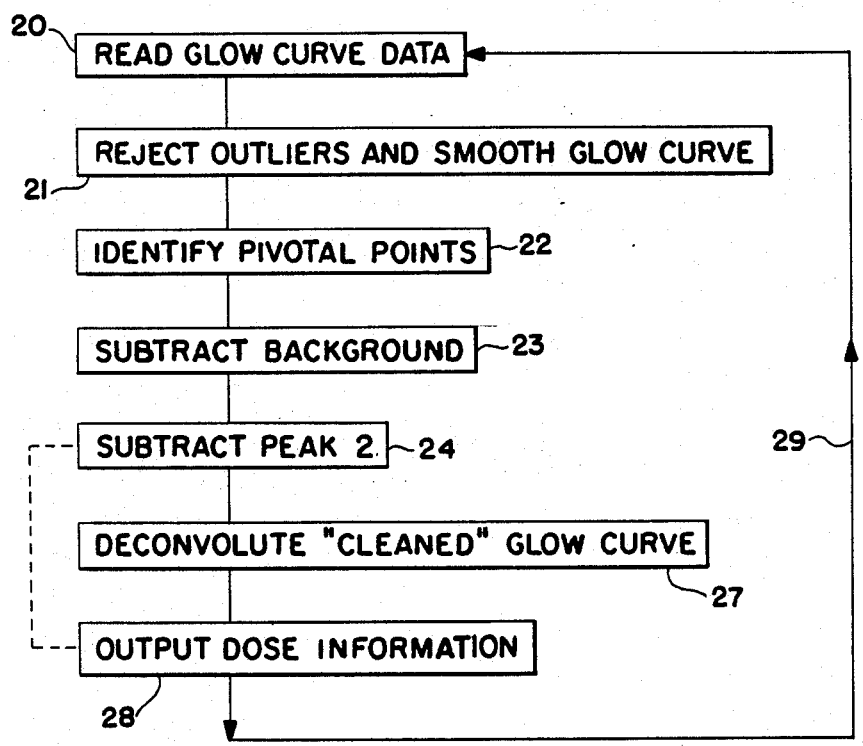
FIG. 3 is a flow chart diagram illustrating the several operational steps of a method according to the present invention.

With reference to FIG. 3, the analysis of the digitized glow curve will now be described. Such analysis, according to the invention, is controlled by and carried out automatically by the computer 12 (FIG. 1). The flow chart of FIG. 3 generally represents the best mode of operating the computer in accordance with the invention. The information presented therein and further detailed below may be reduced in conventional manner to computer program language that may be stored, for example, in ROM of the computer to effect overall control of the computer. It also will be appreciated that modes other than the herein preferred mode may be employed while still embodying principles of the present invention.

Initially the digitized composite glow curve data may be stored by a suitable storage device such as a disk or tape drive whereupon the composite glow curve data is read into RAM in block 20. In block 21, a preparative procedure is performed to reject outliers and smooth out the glow curve. An outlier is a sharply discontinuous data point in the glow curve that may arise from statistically improbable events as well as from apparatus malfunction. A preferred algorithm for rejecting outliers is as follows: for each data point of the glow curve excepting the first and last data points, a check is made of whether the Y (TL signal intensity) value of the data point differs by more than a preprogrammed multiple of the standard deviation, for example two standard deviations, from the average of the neighboring data point Y values, where the standard deviation ($\sigma$) for Poisson Statistics is given by $$\sigma = \sqrt{av}$$

with "av" being the average of the neighboring data point Y values. In such a case the data point is replaced by av. After rejecting outliers, the glow curve is smoothed to remove normal statistical fluctuations preferably by simply averaging every two neighboring data points, i.e., averaging both the Y values and the x values to obtain an averaged or smoothed data point.

In block 22, certain pivotal points and regions in the glow curve are identified and marked. This procedure is based upon a technique of automatic peak search and spectrum marking used in the area of gamma ray spectroscopy, such technique having been disclosed in Zlokazov, V. B., Nuclear Instruments and Methods 199, 509–519 (1982), which is hereby incorporated herein by reference.

Following this technique, the glow curve is marked after recognizing the extrema properties, i.e., local minimum, local maximum, points of inflection, changes in amplitude and statistical fluctuations. To carry out this technique with the FIG. 2 glow curve data in accordance with the present invention, the following symbols are used to describe the pivotal points and to mark the glow curve: F-Foot, T-Top, S-Saddle and B-Bend. The curvature $c_i$ at each data point i, is given by:

$$c_i = [Y_{i+1} - 2Y_i + Y_{i-1}][1 + (Y_{i+1} - Y_i)^2]^{-\frac{3}{2}} \quad (1)$$

which is the discrete analog to:

$$c(x) = Y''(x)[1 + Y'(x)^2]^{-\frac{3}{2}} \quad (2)$$

Each glow curve data point, i, is classified using identification numbers, $A_i$, $C_i$, and $M_i$, which are defined as follows:

$$A_i = \begin{cases} 0 \text{ if } Y_i = b \\ 1 \text{ if otherwise} \end{cases} ; C_i = \begin{cases} -1 \text{ if } c_i \leq -\delta \\ 0 \text{ if } |c_i| \leq \delta \\ +1 \text{ if } c_i > \delta \end{cases} \quad (3)$$

$$M_i = \begin{cases} -1 \text{ if } Y_i = \min(Y_{i-1}, Y_i, Y_{i+1}) \\ +1 \text{ if } Y_i = \max(Y_{i-1}, Y_i, Y_{i+1}) \\ 0 \text{ if otherwise} \end{cases}$$

where the constant b defines the upper limit of the low temperature background value (noise) and constant $\delta$ is equal to the absolute value of the smallest curvature considered to indicate the presence of a peak which, for the hereindescribed best mode, is 1.0. The pivotal points are defined by the identification number set ($A_i$, $C_i$, $M_i$) as follows: F=(0,*,*), T=(1,−1,1), S=(1,1,−1), B+=(1,1,0), B−=(1,−1,0) and E (for End) defines the last data point in the curve (* stands for any value).

Figure 4:
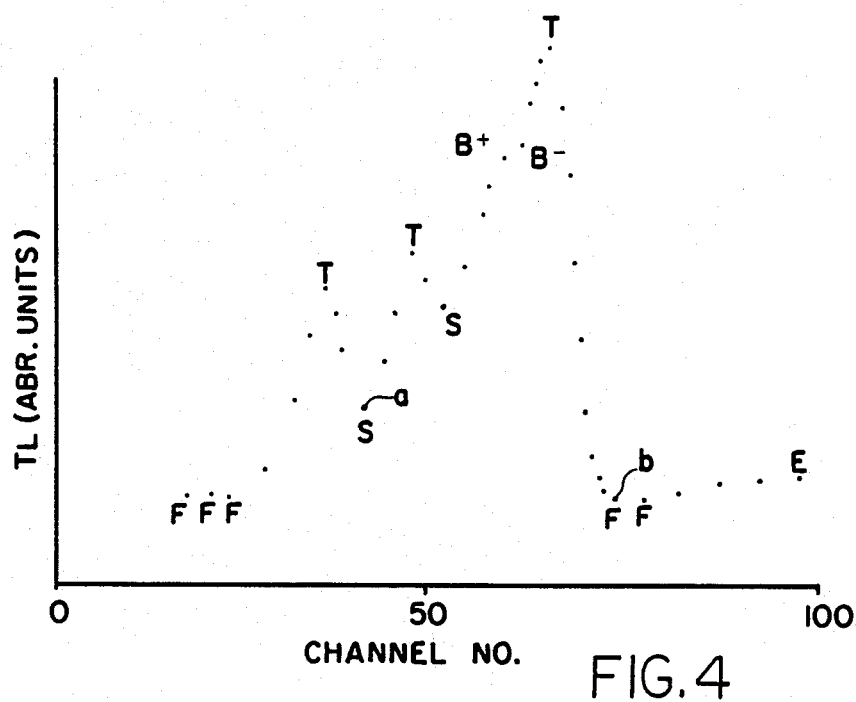
FIG. 4 is a graphical illustration of the results of an automatic peak search method applied to the glow curve of FIG. 1 according to the present invention.

In FIG. 4, the pivotal points are indicated by their corresponding symbols and it can be seen that glow curve regions of the glow curve can be described by the following "words":

Region of Peak 2 - FTS
Region of Peak 3 - STS
Region of Peak 4 - SB+B−T
Region of Peak 5 - B−TF or B−TS
High Temperature Backgound - TFE or TSE Using the "grammar", the pivotal points needed for automatic peak 2 and background subtraction, blocks 23 and 24 in FIG. 3, are identified and marked.

In block 23 the background components are subtracted out of the composite glow curve. For low temperature background (noise) subtraction (which is assumed to be constant during the time of acquisition that is usually on the order of seconds), the average of the first few data points is subtracted from each data of the glow curve.

For high temperature background subtraction, the beginning of high temperature background indicated at b in FIG. 4 is automatically identified by use of the pivotal point marking technique described above. Point b is the first foot pivotal point $[F=(0,*,*)]$ or saddle pivotal point $[S=(1,1,-1)]$ in the glow curve region TFE or TSE. Accordingly, point b may be determined by using the foregoing computer technique without human intervention, i.e., automatically.

After identification of point b, the data points starting at and to the right of point b (the high temperature background data points) are fitted by a function of the form:

$$Y_{IR}=a \exp(-b/T) \qquad (4)$$

where a and b are free parameters that are calculated by fitting equation (4) to the IR high temperature date points using the standard linear least square fitting technique.

Equation (4) is based on Planck's black-body radiation formula. The energy "E" emitted as black body radiation as a function of wave length "λ" at temperature "T°K" is written in the form:

$$E(\lambda) \alpha (\lambda)^{-5}[\exp(-ch/\lambda KT)-1]^{-1} \qquad (5)$$

where K is the Botlzman constand and c and h are the speed of light and Plank's constant, respectively. If λ T is small, equation (5) can be approximated by:

$$E(\lambda) \alpha (\lambda)^{-5}[\exp(-ch/\lambda KT)] \qquad (6)$$

which is equivalent to Wien's formula. For example, if the maximum readout temperature is 300° C. (T=573° K.) and λ is approximately 10000 Angstroms (near infrared) then ch/λKT=25 and thus exp(ch/λKT) is much greater than 1. Assuming that only a narrow band of the spectrum passes the filtration and is common to the spectral response of the photomultiplier tube in the TLD reader, the dependence on λ can be expected to be small and the IR signal can be, therefore, approximated by equation (4) above. This estimate of the background assumes there is only pure background signal at both sides of the glow curve.

Figure 5:
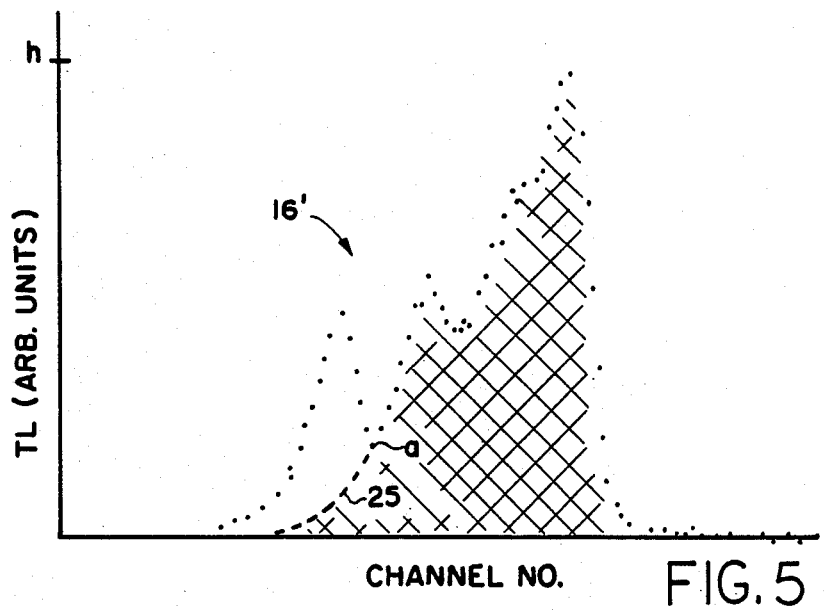
FIG. 5 is a graphical illustration of a leading edge extrapolation method applied to the glow curve of FIG. 1 after background subtraction.

After parameters a and b are calculated by fitting equation (4) to the TL free, high temperature part of the glow curve, equation (4) is then used to subtract the IR background component from the glow curve data points so that such data points will now represent a background free (pure) glow curve which is illustrated at 16′ in FIG. 5.

Although the foregoing background subtraction procedure involves two steps, it will be appreciated that a single step procedure may be employed by fitting to the TL free high temperature part of the glow curve (without first subtracting noise) a function in the form of:

$$Y_{back}=c+a \exp(-b/T) \qquad (7)$$

where "c" is a constant calculated by averaging the first few low temprature data points and "a" and "b" are calculated by the fitting procedure. Equation (7) therefore represents total background which may be subtracted from the smoothed glow curve resulting from block 21 of FIG. 3.

In block 24 (FIG. 3), peak 2 is subtracted out of the glow curve to leave a pure glow curve composed only of peaks (3+4+5). To effect this, the intermediate valley or local minimum between peaks 2 and 3 (point a in FIGS. 4 and 5) is automatically identified by use of the above described pivotal point marking procedure. Point a corresponds to the first saddle pivotal point and this point is used as the low limit of the region defining the sum of the leading edges of peaks (3+4+5). It has been shown that this sum can be approximated by a function of the form:

$$Y=A \exp(-B/T) \qquad (8)$$

where "A" and "B" are free parameters that are calculated by fitting equation (8) to the leading edge data points. The data points used for fitting preferably include the point a as the lower limit and the next seven or so higher temperature data points of the glow curve 16′. The fitting is performed by a linear least squares method to derive parameters A and B, and, then, the equation (8) is used to extrapolate the leading edge back to lower temperatures to effect peak 2 subtraction as illustrated by broken line 25 in FIG. 5.

The just described peak 2 subtraction procedure is similar to the technique disclosed in Pla and Podgorsak, Med. Phys. 10(4), 462–466, (1983), which is hereby incorporated herein by reference. Such earlier technique, however, had the drawback or requiring human intervention to identify the range of data points to which equation (8) was to be fitted. The present invention eliminates this drawback by use of the above described pivotal point marking technique which may be carried out by a computer automatically, i.e., without human subjective identification of the data points to which equation (8) is to be fitted.

After background and peak subtraction, there remains the pure TL response composed of the sum of peaks (3+4+5), this being represented by broken line 25 plus the data points of curve 16′ to the right of point a in FIG. 5. If desired, dose information derived from such "cleaned" glow curve, such as from the height h of peak 5 or from the cross-hatched area under the "cleaned" curve, may be outputted, for example, to the display 14, printer 15 (see FIG. 1) or other device for radiation exposure monitoring or other purposes. It is preferred, however, that such curve be deconvoluted into the individual peaks 3, 4 and 5 for increased precision of measurement as well as other purposes such as evaluation of elapsed time between irradiation and readout. Although the background and peak 2 subtraction (cleaning) both are performed by linear least squares method which has the advantage of being fast and does not require initial parameters, such method cannot separate the strongly overlapping peaks (3+4+5). Hence the following computerized glow curve deconvolution (CGCD) technique, which is based on a nonlinear least squares method, is applied in block 27 of the flow chart shown in FIG. 3.

Figure 6:
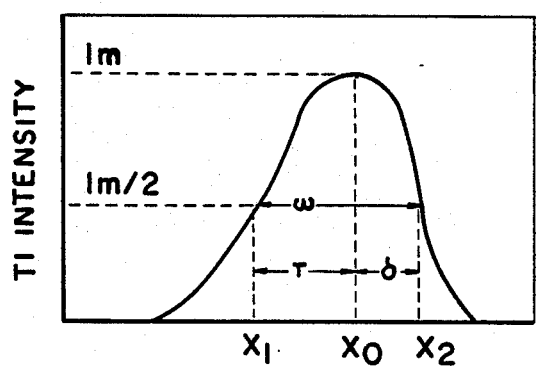
FIG. 6 is a graphical illustration of an isolated glow peak.

Each peak is approximated by the following expressions:

$$P_i(X) = Im_i \exp(1 + W_i(X - Xo_i) - \exp[W_i(X - Xo_i)]) \quad (9)$$

where $Im_i$ is the peak height of peak i, $Xo_i$ is the position of peak i, $W_i$ is a parameter related to the width, $\omega_i$, of peak i and X is an independent variable which can represent temperature, time or channel number. A graphical illustration of expression (9) is shown in FIG. 6 and the relation between the width parameter W and the FWHM (full width at half the maximum of the peak), $\omega$, can easily be obtained by solving numerically the equations:

$$P(\delta) = Im/2 \quad (10)$$

$$P(-\tau) = Im/2$$

with the result $$\tau = 1.46/W; \; \delta = 0.982/W \quad (11)$$

Therefore, $$\omega = 2.44/W \quad (12)$$

The composite glow curve following background and peak 2 subtraction is a superposition of at least 3 overlapping peaks and is given by:

$$Y(X) = \sum_{i=1}^{n} P_i(X) \quad (13)$$

where n is the number of peaks (3 in the herein described exemplary case).

Y(X) is thus a nonlinear function of 3n free parameters which is fitted to the data points that compose the "cleaned" glow curve using the Marquardt Method and applying analytical differentiation to the equation (13). The Marquardt Method is disclosed in Bard, Y., 1974, Nonlinear Parameter Estimation, Academic Press, New York and London, which is hereby incorporated herein by reference.

To implement this method without human intervention, automatic initial parameters selection is necessary and is performed for peaks 3 through 5 in the following manner by the program. The height and position parameters of peak 5 are selected by applying the automatic peak searching routine previously described. The width parameter, W, or peak 5 is calculated using expression (10), where $\delta$ is computed by searching through the high temperature side of the peak to find the half maximum data point. For peaks 3 and 4, the initial parameters are derived from peaks 5's parameters using previous information obtained from user supplied initial parameters fits. This information includes the relative positions and relative widths of the various peaks. Preferred criteria for LiF dosimetry is as follows:

| Heating Rate = 1-10° C./sec | |
|---|---|
| Height Parameter (Im) | $Im_{3,4} = Im_5/4$ |
| Width Parameter (W) | $W_{3,4} = W_5$ |
| Position Parameter (Xo) | $Xo_{,3,4} = Xo_5(.85)^j$ |
| | j = 1 and 2, respectively |
| Heating Rate = 10-20° C./sec | |
| Height Parameter | $Im_{3,4} = Im_5/4$ |
| Width Parameter (W) | $W_{3,4} = 1.2 \, W_5$ |
| Position Parameter (Xo) | $Xo_{3,4} = Xo_5(.9)^j$ |
| | j = 1 and 2 respectively |
| Heating Rate = 20-30° C./sec | |
| Height Parameter (Im) | $Im_{3,4} = Im_5/2.5$ |
| Width Parmaeter (W) | $W_{3,4} = 1.2 \, W_5$ |
| Position Parameter (Xo) | $Xo_{3,4} = Xo_5(.9)^j$ |
| | j = 1 and 2, respectively |

To guarantee convergence, the first iteration is performed by holding the widths of the peaks fixed. In subsequent iterations, all of the parameters are allowed to vary and to achieve optimal fit. Also, the analytical derivates of equation (13) are calculated using the following equations:

$$\frac{\partial}{\partial Im_i} Y(x) = \exp(e_i) = \partial Im_i \quad (14)$$

$$\frac{\partial}{\partial W_i} Y(x) = t_i(X - Xo_i)$$

$$\frac{\partial}{\partial Xo_i} Y(x) = -t_i W_i$$

where:

$$w_i = W_i(X - Xo_i) \quad (15)$$

$$e_i = 1 + w_i - \exp(w_i)$$

$$t_i = Im_i \partial Im_i [1 - \exp(w_i)]$$

Figure 7:
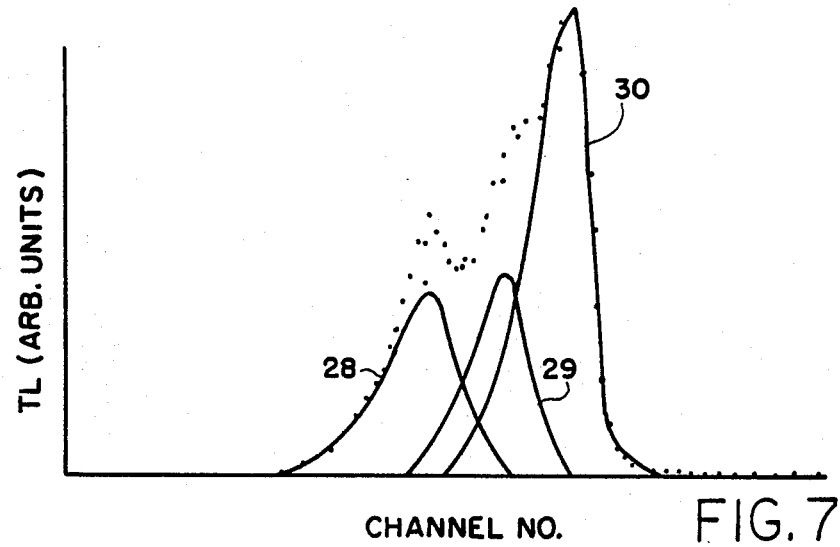
FIG. 7 shows the separated component glow peaks resulting from deconvolution of the glow curve shown in FIG. 5.

In FIG. 7, the separated component peaks 3, 4 and 5 resulting from glow curve deconvolution are indicated at 28, 29 and 30, respectively.

The foregoing computerized deconvolution technique gives rise to a meaningful and significant reduction in computer processing time per deconvolution and eliminates the need for user supplied initial parameters. Instead, the initial parameters are computed automatically and directly from the glow curve shape. Accordingly, glow curves read from a plurality of TL elements may be sequentially processed automatically.

By deconvoluting the glow curve into its component parts, increased precision of measurement can be achieved. For example, the interfering lower temperature peak 3 can be eliminated with outputted dose information, block 28, being based solely on the measurement of the integral or height of peak 5 alone or the integral of peaks 4 and 6. Of course, other meaningful information may be derived from the deconvoluted peaks such as the time between irradiation and read-out. Such determination of elapsed time may be based upon the ratio of peak 3 to peak 5 integrals and, as will be appreciated, the foregoing procedure enables time since irradiation to be measured within reasonable accuracy in routine dosimetry. Also, the method of the present invention overall provides the capability of relatively low dose measurements as on the order of a tenth of a millirad.

It should also now be apparent from the foregoing description that the method, as an important advantage, may be executed automatically by a computer, i.e., without the need of human intervention, thereby enabling sequential automatic analysis of glow curves for a plurality or batch of TL elements as indicated by line 29 in FIG. 3. After any needed batch processing information is inputted such as heating rate of the TL elements, the glow curve for plural TL elements can be analyzed automatically to obtain dose information which then may be stored and/or outputted in desired manner. In contrast to prior dose measurement methods, there is no need for interactive selection of regions of interest and/or specific glow curve data points during performance of the method steps depicted in the flow chart of FIG. 3.

While the invention has been described with particular reference to a general purpose programmable computer with or without programmed read only memory, it will be understood that features of the invention which are presently programmed in software form may be embodied in hardware form.

For purposes of simplifying the foregoing description of the invention, language has been utilized which may sound like it is concerned with mental processes but which, in fact, is concerned with physical processes. For example, the terms glow curve, data points and the like refer to information signals and data signals or other manifestations of information and data which are capable of physical manipulation. In the embodiment of the invention described involving use of a computer, the symbols in question are stored in a binary form in charged cells, such cells usually being charged in one direction to represent a value zero and in the opposite direction to represent a value one in the binary system. Accordingly, the various computational and procedural expressions refer to manipulation of those signals or manifestations.

Although the invention has been shown and described with respect to a preferred form of method and apparatus, it is obvious that equilavent alterations and modifications will occur to others skilled in the art upon the reading and understanding of this disclosure. The present invention includes all such equivalent alterations and modifications, and is limited only be the scope of the following claims.

I claim:

1. A method of measuring radiation dose absorbed by a dosimeter using composite glow curve date obtained with a thermoluminescent dosimetry reader wherein such composite glow curve data is composed of the superposition of plural overlapping glow peaks plus instrumental and dosimeter background, comprising the steps of:
   (a) acquiring composite glow curve data of a dosimeter, and
   (b) analyzing said composite glow curve data to derive the absorbed radiation dose of the dosimeter, said analyzing step including the steps of:
      (i) automatically identifying at least one pivotal point in the composite glow curve, and
      (ii) using a thusly identified pivotal point automatically to subtract high temperature infrared background from the composite glow curve data.

2. A method as set forth in claim 1, wherein a first pivotal point marking the beginning of high temperature background is automatically identified, and an exponential function is automatically fitted to glow curve data points on the high temperature side of the identified first pivotal point to determine the infrared background for subtraction from the composite glow curve data.

3. A method as set forth in claim 2, wherein said exponential function is $$Y_{IR} = a \exp(-b/T)$$

where "T" is the phosphor temperature in degrees Kelvin, and "a" and "b" are free parameters that are calculated by fitting such exponential function to the data points on the high temperature side of the identified first pivotal point.

4. A method as set forth in claim 2, including the step of automatically subtracting from each data point in the composite glow curve the average of plural low temperature data points normally preceding the first glow peak.

5. A method as set forth in claim 4, wherein a second pivotal point marking the valley between a lower and next higher temperature glow peak is identified, and an exponential function is fitted to glow curve data points on the high temperature side of the identified second pivotal point for extrapolating the leading edge of said next higher temperature glow peak back to lower temperatures.

6. A method as set forth in claim 5, wherein said exponential function is $$Y = A \exp(-B/T)$$

where "T" is the phosphor temperature in degrees Kelvin, and "A" and "B" are free parameters that are calculated by fitting such exponential function to the data points on the high temperature side of the identified second pivotal point.

7. A method as set forth in claim 1, including the step of automatically subtracting from each data point in the composite glow curve the average of plural low temperature data points normally preceding the first glow peak.

8. A method as set forth in claim 1, including the step of automatically extrapolating a leading edge of a higher temperature glow peak to subtract out a lower temperatuare glow peak.

9. A method as set forth in claim 1, wherein said step of automatically identifying includes classifying glow curve data points using identification numbers defined as follows:

$$A_i = \begin{cases} 0 \text{ if } Y_i = b \\ 1 \text{ if otherwise} \end{cases} ; C_i = \begin{cases} -1 \text{ if } c_i \leq -\delta \\ 0 \text{ if } |c_i| \leq \delta \\ +1 \text{ if } c_i > \delta \end{cases} \quad (3)$$

$$M_i = \begin{cases} -1 \text{ if } Y_i = \min(Y_{i-1}, Y_i, Y_{i+1}) \\ +1 \text{ if } Y_i = \max(Y_{i-1}, Y_i, Y_{i+1}) \\ 0 \text{ if otherwise} \end{cases}$$

where the constant b defines the upper limit of the low temperature background value and the constant $\delta$ is equal to the absolute value of a preselected curvature indicating the presence of a peak, and pivotal points corresponding to a foot (F), top (T), saddle (S) and bend (B) of the glow curve are defined by the following identification number sets $F=(0,*,*,)$, $T=(1,-1,1)$, $S=(1,1,-1)$, $B^+=(1,1,0)$, $B^-=(1,-1,0)$ and E (for End) defines the last data point in the curve (* stands for any value).

10. A method as set forth in claim 1, wherein prior to automatic identification of said at least one pivotal point, the composite glow curve data is smoothed by rejecting outlying data points in accordance with a predetermined criteria.

11. A method as set forth in claim 10, wherein rejected outlying data points are replaced by an average of neighboring data points.

12. A method of measuring radiation dose absorbed by a dosimeter using composite glow curve data obtained with a thermolumimescent dosimetry reader wherein such composite glow curve data is composed of the superposition of plural overlapping glow peaks plus instrumental and dosimeter background, comprising the steps of:
   (a) acquiring composite glow curve data of a dosimeter, and
   (b) analyzing said composite glow curve data to derive the absorbed radiation dose of the dosimeter, said analyzing step including the steps of:
      (i) automatically identifying at least one pivotal point in the composite glow curve located between a lower temperature glow peak and a next higher temperature glow peak, and
      (ii) using such at least one pivotal point automatically to subtract the lower temperature glow peak from the glow curve data.

13. A method as set forth in claim 12, including the step of subtracting instrumental noise and dosimeter background from the composite glow curve data before subtracting the lower temperature glow peak from such data.

14. A method as set forth in claim 13, wherein the lower temperature glow peak is subtracted using a leading edge extrapolation technique.

15. A method as set forth in claim 14, wherein a first pivotal point marking the valley between the lower and next higher temperature glow peak is identified, and an exponential function is fitted to glow curve data points on the high temperature side of the identified first pivotal point for extrapolating the leading edge of said higher temperature glow peak back to lower temperatures.

16. A method as set forth in claim 15, wherein said exponential function is $$Y = A \exp(-B/T)$$

where "T" is the phosphor temperature in degrees Kelvin, and "A" and "B" are free parameters that are calculated by fitting such exponential function to the data points on the high temperature side of said identified first pivotal point.

17. A method as set forth in claim 15, wherein a second pivotal point marking said next higher temperature glow peak is automatically identified, and the exponential function is fitted only to glow curve data points within a maximum range defined by said first and second pivotal points.

18. A method as set forth in claim 12, wherein prior to automatic identification of said at least one pivotal point, the composite glow curve data is smoothed by rejecting outlying data points in accordance with a predetermined criteria.

19. A method as set forth in claim 18, wherein rejected outlying data points are replaced by an average of neighboring data points.

20. A method of measuring radiation dose absorbed by a dosimeter using composite glow curve data obtained with a thermoluminescent dosimetry reader wherein such composite glow curve data is composed of the superposition of plural overlapping glow peaks plus instrumental and dosimeter background, comprising the steps of:
   (a) acquiring composite glow curve data of a dosimeter, and
   (b) analyzing said composite glow curve data to derive the absorbed radiation dose of the dosimeter, said analyzing step including the steps of:
      (i) automatically applying analytical differentiation to a model equation for the sum of n peaks, such equation being $$Y(X) = \sum_{i=1}^{n} Im_i \exp(1 + W_i(X - Xo_i) - \exp[W_i(X - Xo_i)])$$

where $Im_i$, $W_i$ and $Xo_i$ are the amplitude, width and position parameters, respectively, and X is an independent variable (channel number or temperature), and the analytical derivates of such equation being calculated by using the following equations:

$$\frac{\partial}{\partial Im_i} Y(x) = \exp(e_i) = \partial Im_i \quad (14)$$

$$\frac{\partial}{\partial W_i} Y(x) = t_i(X - Xo_i)$$

$$\frac{\partial}{\partial Xo_i} Y(x) = -t_i W_i$$

where:

$$w_i = W_i(X - Xo_i) \quad (15)$$

$$e_i = 1 + w_i - \exp(w_i)$$

$$t_i = Im_i \partial Im_i [1 - \exp(w_i)].$$

21. Apparatus for measuring radiation dose absorbed by a dosimeter using composite glow curve data obtained with a thermoluminescent dosimetry reader wherein such composite glow curve data is composed of the superposition of plural overlapping glow peaks plus instrumental and dosimeter background, comprising:
   (a) means for acquiring composite glow curve data of a dosimeter, and
   (b) computer means for analyzing said composite glow curve data to derive the absorbed radiation dose of the dosimeter, said analyzing means including:
      (i) means for automatically identifying at least one pivotal point in the composite glow curve, and
      (ii) means for using a thusly identified pivotal point automatically to subtract high temperature infrared background from the composite glow curve data.

22. Apparatus for measuring radiation dose absorbed by a dosimeter using composite glow curve data obtained with a thermoluminescent dosimetry reader wherein such composite glow curve data is composed of the superposition of plural overlapping glow peaks plus instrumental and dosimeter background, comprising:
(a) means for acquiring composite glow curve data of a dosimeter, and
(b) computer means for analyzing said composite glow curve data to derive the absorbed radiation dose of the dosimeter, said analyzing means including:
(i) means for automatically identifying at least one pivotal point in the composite glow curve located between a lower temperature glow peak and a next higher temperature glow peak, and
(ii) means for using such at least one pivotal point automatically to subtract the lower temperature glow peak from the glow curve data.

23. A method of measuring radiation dose absorbed by a dosimeter using composite glow curve data obtained with a thermoluminescent dosimetry reader wherein such composite glow curve data is composed of the superposition of plural overlapping glow peaks plus instrumental and dosimeter background, comprising the steps of:
(a) acquiring composite glow curve data of a dosimeter; and
(b) analyzing said composite glow curve data to derive the absorbed radiation dose of the dosimeter, said analyzing step including the steps of:
(i) automatically applying analytical differentiation to a model equation for the sum of n peaks to deconvolute the glow curve into individual glow curve peaks, and
(ii) using the deconvoluted glow curve peak data to derive the absorbed radiation dose.

24. A method as set forth in claim 23, wherein step (i) includes computing the initial parameters automatically and directly from the glow curve data.

25. A method as set forth in claim 24, including the step of automatically identifying at least one pivotal point in the composite glow curve and then using such at least one pivotal point to determine at least one of the initial parameters required for analytical differentiation of the model equation.

26. A method as set forth in claim 23, wherein said model equation is $$Y(X) = \sum_{i=1}^{n} Im_i \exp(1 + W_i(X - Xo_i) - \exp[W_i(X - Xo_i)])$$

where $Im_i$, $W_i$ and $Xo_i$ are the amplitude, width and position parameters for the ith glow curve peak, respectively, and X is an independent variable (channel number or temperature), and the analytical derivatives of such equation being calculated by using the following equations:

$$\frac{\partial}{\partial Im_i} Y(x) = \exp(e_i) = \partial Im_i \quad (14)$$

$$\frac{\partial}{\partial W_i} Y(x) = t_i(X - Xo_i)$$

$$\frac{\partial}{\partial Xo_i} Y(x) = -t_i W_i$$

where:

$$w_i = W_i(X - Xo_i) \quad (15)$$

$$e_i = 1 + w_i - \exp(w_i)$$

-continued
$$t_i = Im_i \partial Im_i [1 - \exp(w_i)].$$

27. A method as set forth in claim 26, including the step of deriving the initial amplitude, width and position parameters of at least one peak from the parameters of another peak which are derived from the glow curve data.

28. A method as set forth in claim 23, including the steps of automatically identifying at least one pivotal point in the composite glow curve, and using a thusly identified pivotal point automatically to subtract high temperature infrared background from the composite glow curve data.

29. A method as set forth in claim 23, including the steps of automatically identifying at least one pivotal point in the composite glow curve located between a lower temperatue glow peak and a next higher temperature glow peak, and using such at least one pivotal point automatically to subtract the lower temperature glow peak from the glow curve data.

30. Apparatus as set forth in claim 21, including means for automatically identifying a first pivotal point marking the beginning of high temperature background and means for automatically fitting an exponential function to glow curve data points on the high temperataure side of the identified first pivotal point to determine the infrared background for subtraction from the composite glow curve data.

31. Apparatus as set forth in claim 30, wherein said exponential function is $$Y_{IR} = a \exp(-b/T)$$

where "T" is the phosphor temperature in degrees Kelvin, and "a" and "b" are free parameters that are calculated by fitting such exponential function to the data points on the high temperature side of the identified pivotal point.

32. Apparatus as set forth in claim 30, including means for identifying a second pivotal point marking the valley between a lower and next higher temperatuare glow peak, and means for fitting an exponential function to glow curve data points on the high temperature side of the identified second pivotal point for extrapolating the leading edge of said higher temperature glow peak back to lower temperatures.

33. Apparatus as set forth in claim 22, including means for subtracting instrumental noise and dosimeter background from the composite glow curve data before subtracting the low temperature glow peak from such data.

34. Apparatus as set forth in claim 22, wherein the lower temperature glow peak is subtracted using a leading edge extrapolation technique.

35. Apparatus as set forth in claim 22, including means for identifying a first pivotal point marking the valley between the lower and next higher temperature glow peak, and means for fitting an exponential function to glow curve data points on the high temperature side of the identified first pivotal point for extrapolating the leading edge of said next higher temperature glow peak back to lower temperatures.

36. Apparatus as set forth in claim 35, including means for automatically identifying a second pivotal point marking said next higher temperature glow peak and means for fitting the exponential function only to glow curve data points within a maximum range defined by the first and second pivotal points.

* * * * *